US012501364B2

(12) United States Patent
Amir et al.

(10) Patent No.: US 12,501,364 B2
(45) Date of Patent: Dec. 16, 2025

(54) SLAVE AND MASTER DEVICES AND METHODS USING A PREAMBLE EXTENSION TO SET A POWER MODE

(71) Applicant: Essence Security International (E.S.I.) Ltd., Herzliya Pituach (IL)

(72) Inventors: Ohad Amir, Herzlia Pituach (IL); Koby Ben Shloosh, Petah-Tikva (IL)

(73) Assignee: Essence Security International (E.S.I.) Ltd., Herzliya (IL)

( * ) Notice: Subject to any disclaimer, the term of this patent is extended or adjusted under 35 U.S.C. 154(b) by 374 days.

(21) Appl. No.: 17/789,724

(22) PCT Filed: Dec. 30, 2020

(86) PCT No.: PCT/IL2020/051352
§ 371 (c)(1),
(2) Date: Jun. 28, 2022

(87) PCT Pub. No.: WO2021/137226
PCT Pub. Date: Jul. 8, 2021

(65) Prior Publication Data
US 2024/0015646 A1 Jan. 11, 2024

(30) Foreign Application Priority Data
Dec. 30, 2019 (GB) ..................................... 1919424

(51) Int. Cl.
*H04W 52/02* (2009.01)
*H04J 3/06* (2006.01)

(52) U.S. Cl.
CPC ....... *H04W 52/0229* (2013.01); *H04J 3/0644* (2013.01); *Y02D 30/70* (2020.08)

(58) Field of Classification Search
CPC ......... H04W 52/0229; H04W 52/0212; H04W 52/0209; H04J 3/0644
See application file for complete search history.

(56) References Cited

U.S. PATENT DOCUMENTS

| 4,649,385 A | 3/1987 | Aires et al. |
| 7,502,619 B1 | 3/2009 | Katz |
| (Continued) | | |

FOREIGN PATENT DOCUMENTS

| EP | 1119137 A1 | 7/2001 |
| EP | 2227062 | 9/2010 |
| (Continued) | | |

OTHER PUBLICATIONS

IEEE Std 802.15.4-2015 (802.15.4), titled IEEE Standard for Low-Rate Wireless Networks. (Year: 2015).*
(Continued)

*Primary Examiner* — Ayaz R Sheikh
*Assistant Examiner* — Christopher R Davis
(74) *Attorney, Agent, or Firm* — Schwegman Lundberg & Woessner, P.A.

(57) ABSTRACT

Frames of a first and second type with a common preamble that are periodically transmitted by a master device (200) are received at a slave device (100) that is maintained in a low powered mode, and periodically set in a higher-powered mode to receive and process the received frames based on a slave clock (130) in a period prior to an expected transmission of the common preamble of each frame from the master device (200) to detect a preamble extension of a frame of the second type in the period. The slave device (100) returns to a low powered mode when no preamble extension is detected in the period. Information is received from and/or transmitted to the master device (200) by the slave device (100) when a preamble extension is detected. The slave device (100) is returned to the low powered mode after the information has been received and/or transmitted.

17 Claims, 8 Drawing Sheets

(56) References Cited

U.S. PATENT DOCUMENTS

| | | | |
|---|---|---|---|
| 7,639,131 | B2 | 12/2009 | Mock et al. |
| 8,160,045 | B1 | 4/2012 | Chhabra |
| 2004/0218620 | A1 | 11/2004 | Palm et al. |
| 2004/0246983 | A1* | 12/2004 | Kaatz .................... H04W 48/08 370/432 |
| 2008/0316022 | A1 | 12/2008 | Buck et al. |
| 2009/0137206 | A1 | 5/2009 | Sherman et al. |
| 2010/0110948 | A1 | 5/2010 | Batta |
| 2011/0164605 | A1* | 7/2011 | Zhen .................... H04W 56/00 370/347 |
| 2013/0044658 | A1 | 2/2013 | Zhu et al. |
| 2015/0079907 | A1 | 3/2015 | Engelien-lopes |
| 2015/0201389 | A1 | 7/2015 | Linsky et al. |
| 2018/0184377 | A1 | 6/2018 | Kenney et al. |
| 2018/0310247 | A1* | 10/2018 | Chu .................. H04W 52/0235 |
| 2018/0343614 | A1* | 11/2018 | Cao .................. H04W 52/0225 |
| 2019/0190765 | A1 | 6/2019 | Murali et al. |
| 2024/0015651 | A1* | 1/2024 | Naftali .............. H04W 52/0229 |

FOREIGN PATENT DOCUMENTS

| | | | | |
|---|---|---|---|---|
| WO | WO-2015094363 | A1 * | 6/2015 | ........ H04W 52/0216 |
| WO | WO-2021137226 | A1 | 7/2021 | |

OTHER PUBLICATIONS

"International Application Serial No. PCT/IL2020/051352, International Search Report mailed Mar. 5, 2021", 5 pgs.

"International Application Serial No. PCT/IL2020/051352, Written Opinion mailed Mar. 5, 2021", 11 pgs.

IEEE, "Part 15.4 Wireless Medium Access Control MAC and Physical Layer PHY Specifications for Low Rate Wireless Personal Area Networks WPANs", IEEE Computer Society, Sponsored by the LAN MAN Standards Committee, IEEE Standards Association, IEEE Std 802.15.4-2006, (Sep. 2006), 323 pages.

"App. No. GB1919424.0 Combined Search and Examination Report under Sections 17 and 18 3 mailed May 18, 2020", 6 pages.

* cited by examiner

PRIOR ART

| COMMON PREAMBLE | SFD | PHY HEADER | DATA LINK LAYER HEADER, INCLUDING PENDING FIELD | DATA LINK LAYER SERVICE UNIT AND FOOTER |

FIG 4A

| PRE-AMBLE EXT | COMMON PREAMBLE | SFD | PHY HEADER | DATA LINK LAYER HEADER, INCLUDING PENDING FIELD | DATA LINK LAYER SERVICE UNIT AND FOOTER |

FIG 4B

SLAVE AND MASTER DEVICES AND METHODS USING A PREAMBLE EXTENSION TO SET A POWER MODE

RELATED APPLICATION

This application is a U.S. National Stage Application under 35 U.S.C. 371 from International Application No. PCT/IL2020/051352, filed Dec. 30, 2020, and published as WO 2021/137226 on Jul. 8, 2021, which claims the benefit of priority of G.B. Application No. 1919424.0 filed on 30 Dec. 2019, the contents of which are incorporated herein by reference in their entirety.

FIELD OF THE INVENTION

The present invention relates generally to slave and master devices and methods, and more particularly to such devices and method in which frames are transmitted from the master device to one or more slave devices.

BACKGROUND INFORMATION

Low power wireless communications can be used in many circumstances for communicating between devices in circumstances where power consumption needs to be kept low to enable battery powered devices to be used for long periods.

The IEEE 802.15.4 standard protocol is an example of a Wireless Personal Area Network (WPAN) which could be used for low power consumption for devices that require a long battery life. The 802.15.4 standard allows for devices to operate in a peer-to-peer network or in a star network in which one device is a full function device (a master device) and the others that connect to it are reduced function devices (slave devices).

FIG. 1 is a schematic diagram of an example physical layer (PHY) frame structure that is consistent an Open Systems Interconnection (OSI) framework. The frame structure may be used as a beacon frame, for example to achieve beacon functionality as in the 802.15.4 standard. The depicted frame is an example of PHY Protocol Data Unit (PPDU) that is consistent with the OSI model. It includes a PHY Service Data Unit (PSDU) formed of a Data Link Layer Service unit and footer and a Data Link Layer Header (DLH). The PSDU may also be referred to as a Mac Protocol Data Unit (MPDU). The DLH is formed of an address portion a pending portion and a portion for other data. The PPDU is also formed of a PHY header and a Synch Header. The Synch Header is formed of a Start Frame Delimiter (SFD) and a preamble.

FIG. 2 is a schematic diagram of a timing diagram using beacon frames, for example those of FIG. 1, to maintain synchronization between the master and the slaves and inform the slaves about a needed communication, in accordance with the 802.15.4 standard. The beacon frames BF1 to BF6 are transmitted regularly at transmission times T1 to T6 and carry resynchronization information from a full function device operating as a beacon device. "Synchronization information" as referred to herein may consist of or comprise the preamble (or at least a part thereof) in combination with the SFD. Based on the synchronization information, the slave device is able to identify when the MPDU starts. The frequency of the beacon frames is known (i.e. the periodicity at which they occur) is known, so based on the synchronization information the slave can determine how long it will be until the next beacon. The slave operates a counter from the last synchronization event to estimate when the next beacon will be. The counter may count, for example, from the start of the SFD. In another example the count may be from an end of the beacon frame, wherein the end may be determined based on a length field in the frame or may be preprogramed based on a known fixed length of all beacon frames. The counter operates based on a slave clock, which can drift relative to the master clock and hence the need to reset the counter based on the last synchronization event.

Beacon frames BF1, BF2, BF3, BF4, BF5 and BF6 are of frames lengths L1, L2, L3, L4, L5 and L6, which are the same. However, beacon frame BF3 is different to the others in that unlike the other beacon frames that have the DLH pending portion not set, the DLH pending portion is set indicating that there is a following data frame DF3 transmitted after BF3 but before BF4. The data frame DF3 is also a PPDU frame, but its MPDU has a different frame structure to the beacon frames.

As can be seen in FIG. 2, each of the beacon frames BF1-6 are transmitted with their preamble starting at the transmission times of T1-6. A reduced function device acting as a slave device operates in a low power mode and under the control of a local slave clock, the slave device moved to higher power mode at the transmission time T1 and T2 to detect the preamble of the beacon frames and then once the frame is detected it is processed. Once the frame is processed the slave device can exit the higher power mode and return to the low power mode. If the beacon frame identifies that a data frame follows, such as BF3 and DF3, the slave device can ensure it is in the higher power mode when the data frame DF3 arrives for the detection and processing of the data frame DF3, returning to the low power mode after processing the data frame.

The beacon frames in this example can carry master clock resynchronization information for the master clock in the master device used for control of the timing of the transmission of the beacon frames BF1-6. Hence, each time the slave device enters the higher power mode to detect and read the beacon frame, it can read the master clock resynchronization information and reset the counter at the slave device to ensure that the slave device 'wakes up' at the correct time for the next beacon frame. The fact that each frame causes the slave counter reset is indicated under each transmission time T1-6 by the word SYNCH.

While this method provides for reduced power at the slave devices, since the slave devices can drop to a low power mode in between beacon frames, it still requires each slave device to 'wake up' to detect and process each beacon frame. Each slave device is hence in the higher power mode for the periods L1, L2, L3a, L3b, L4, L5 and L6. However, the beacon frames causing the slave device to enter the higher power mode for the periods L1, L2, L4, L5 and L6 do not configure the slave device to receive a 'data payload', which in this example is delivered by a data frame DF3. The size of the data payload and therefore the length of the data frame may vary from data payload to data payload.

SUMMARY OF THE INVENTION

The present invention provides a slave device for wirelessly receiving frames wirelessly transmitted from a master device, the frames being of a first and second type and having a common preamble, the frames of the second type having a preamble extension prior to the common preamble, the frames being wirelessly transmitted from the master device at a known periodicity and within a known time frame, the slave device comprising a processor configured to maintain the slave device in at least one low powered mode relative to at least one higher power mode, and periodically sets the slave device in a higher-powered mode to wirelessly receive and process the frames of the first or second type wirelessly transmitted from the master device; and a slave clock; wherein the processor is configured to: based on the slave clock, set the slave device in a higher-powered mode in a period prior to an expected wireless transmission of the common preamble of each frame from the master device to detect a preamble extension of a frame of the second type in the period; return the slave device to a low powered mode when no preamble extension is detected in the period; and control the slave device to wirelessly receive information from the master device and/or wirelessly transmit information to the master device when a preamble extension is detected in the period, and return the slave device to a low powered mode after the information has been wirelessly received and/or wirelessly transmitted.

The present invention also provides a method at a slave device for wirelessly receiving frames wirelessly transmitted from a master device, the frames being of a first and second type and having a common preamble, the frames of the second type having a preamble extension prior to the common preamble, the frames being wirelessly transmitted from the master device at a known periodicity and within a known time frame, the method comprising maintaining the slave device in at least one low powered mode; periodically setting the slave device in a higher-powered mode to wirelessly receive and process frames of the second type wirelessly transmitted from the master device; wherein the slave device is set in the higher-powered mode based on a slave clock in a period prior to an expected wirelessly transmission of the common preamble of each frame from the master device to detect a preamble extension of a frame of the second type in the period; the slave device is returned to the low powered mode when no preamble is detected in the period; and the slave device is controlled to wirelessly receive information from the master device and/or wirelessly transmit information to the master device when a preamble extension is detected in the period, and return the slave device to a low powered mode after the information has been wirelessly received and/or wirelessly transmitted.

The present invention also provides a master device comprising a processor configured to control the master device to wirelessly transmit frames of a first and second type to at least one slave device, the frames of the first and second type having a common preamble and the frames of the second type having a preamble extension prior to the preamble, wherein the processor is configured to wirelessly transmit the frames to the at least one slave device at a known periodicity and within a known time frame; and a master clock for defining the known periodicity and time frame; wherein the processor is configured to control the master device to wirelessly receive information from the at least one slave device and/or wirelessly transmit information to the at least one slave device based on a wireless transmission of a frame of the second type.

The present invention further provides a method at a master device comprising controlling the master device to wirelessly transmit frames of a first and second type to at least one slave device, the frames of the first and second type having a common preamble and the frames of the second type having a preamble extension prior to the common preamble; wherein the frames are wirelessly transmitted to the at least one slave device at a known periodicity and within a known time frame based on a master clock; and information is wirelessly received from the at least one slave device and/or wirelessly transmitted to the at least one slave device based on a wireless transmission of a frame of the second type.

BRIEF DESCRIPTION OF THE SEVERAL VIEWS OF THE DRAWINGS

FIGS. 4A and 4B are schematic diagrams illustrating a first and second type of frame in accordance with one or more embodiments;

DETAILED DESCRIPTION

Figure 1:
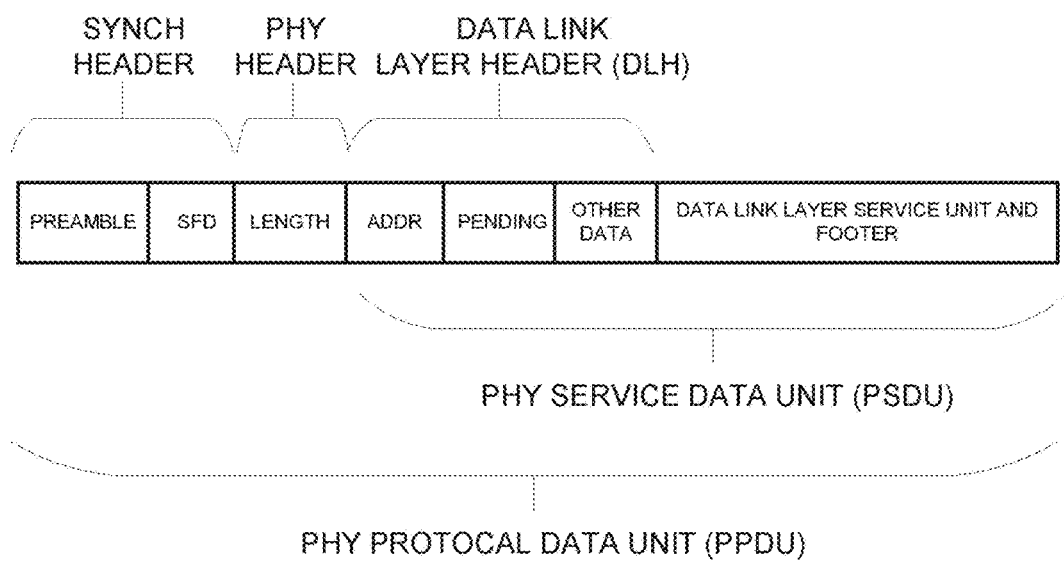
FIG. 1 is a schematic diagram illustrating a prior art communication beacon frame structure.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized, and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents.

In the following embodiments, like components are labelled with like reference numerals.

In the following embodiments, the term data store or memory is intended to encompass any computer readable storage medium and/or device (or collection of data storage mediums and/or devices). Examples of data stores include, but are not limited to, optical disks (e.g., CD-ROM, DVD- ROM, etc.), magnetic disks (e.g., hard disks, floppy disks, etc.), memory circuits (e.g., EEPROM, solid state drives, random-access memory (RAM), etc.), and/or the like.

The functions or algorithms described herein are implemented in hardware, software or a combination of software and hardware in one embodiment. The software comprises computer executable instructions stored on computer readable carrier media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Some embodiments are implemented as processor implementable code provided on a carrier medium. The carrier medium can comprise a non-transient storage medium such as solid-state memory, a magnetic disk, optical disk etc., or a transient medium such as a signal transmitted over a computer network.

As used herein, except wherein the context requires otherwise, the terms "comprises", "includes", "has" and grammatical variants of these terms, are not intended to be exhaustive. They are intended to allow for the possibility of further additives, components, integers or steps.

One or more generalized embodiments of the invention provides a method and a slave device for wirelessly receiving frames transmitted from a master device. The frames are of a first and second type and have a common preamble. The frames of the second type have a preamble extension prior to the common preamble and the frames are wirelessly transmitted from the master device at a known periodicity and within a known time frame. The slave device is maintained in at least one low powered mode until it is activated to conserve power. The slave device is periodically set in a higher-powered mode to wirelessly receive and process frames of the second type wirelessly transmitted from the master device. The slave device is set in the higher-powered mode based on a slave clock in a period prior to an expected wireless transmission of the common preamble of each frame from the master device to detect a preamble extension of a frame of the second type in the period. The slave device is returned to the low powered mode when no preamble is detected in the period, and the slave device is controlled to wirelessly receive information from the master device and/or wirelessly transmit information to the master device when a preamble extension is detected in the period, and return the slave device to a low powered mode after the information has been wirelessly received and/or wirelessly transmitted.

The "known time frame" may be analogous to a "super frame" in IEEE 802.15.4. Each occurrence of such a time frame contains one of said frames of the first or second type. However, each frame of the first or second type has a duration that is less than the corresponding known time frame in which it occurs, so that if needed frames other than those of the first or second type may also be included within the known time frame. Successive known time frames start at the earliest time that a preamble extension could commence (accounting for clock drift), if the frame is or were of the second type. The amount of time between respective starts of the common preambles of successive frames of the first type or second type is fixed, so that the starts of successive common preambles of the frames of the first or second time occur at a fixed periodicity which is known (assuming no clock drift).

In some embodiments, the controlling of the slave device to wirelessly receive information from the master device and/or wirelessly transmit information from the master device comprises receiving at least part of said frame of the second type.

In some embodiments, the controlling of the slave device to wirelessly receive information from the master device and/or wirelessly transmit information from the master device further comprises, based on at least part of said frame, controlling the slave device to wirelessly receive and/or wirelessly transmit information after said part of said frame.

For example, based on information encoded in the frame the slave may be controlled to either wirelessly receive more information (for example, the frame having a MAC frame that is larger than the beacon MAC frame of the frame of the first type, and/or in a separate one or more PPDU frames) and/or to wirelessly transmit information (in one or more separate PPDU frames).

The provision of the preamble extension in a period before the expected timing of the common preamble enables the slave device to enter a higher power mode for a short period of time to 'listen' for the preamble extension. If it is not there, the slave device can go back to the low powered mode without having to stay in the higher power mode to receive the frame. Hence, a master device can modify a preamble by adding a preamble extension when information is to be received from and/or to transmitted to the slave device and the slave device need only 'listen' for the short preamble extension period to be able to decide whether to stay in the higher powered mode to receive and/or transmit information to and/or from the master device. This avoids the slave device having to be set in a high-power mode for each frame to receive the frame and process it to determine if the frame has information contents that are relevant to the slave device. Using the preamble extension, the frames of the first type need not be detected and the slave device can remain in a low power mode while these are being transmitted by the master device.

In one or more embodiments, the information from the master device includes master clock synchronization information, and the master clock synchronization information is used to resynchronize the slave device. Hence, in addition to information being wirelessly received from and/or wirelessly transmitted to the master device, the inclusion of master clock information in the second frame enables the slave device to perform a synchronization. Synchronization of the slave device with the master device is desirable since the slave device needs to be able to 'wake up' into a higher powered mode at the right time to listen for the preamble extension in the period prior to the expected transmission of the common or normal preamble for the first type of frames.

In one or more embodiments, the slave device includes a counter controlled by the slave clock, and the processor is configured to set the slave device in the higher-powered mode based on the counter reaching a value and resynchronize the slave device by resetting the counter. On one or more embodiments, the master device can include a counter controller by the master clock and the counter is used to control the wireless transmission of the frames. The master counter can be reset each time at the start of end of a frame to count up/down to the next frame transmission time. Hence, the synchronization of the slave device to the master device in one or more embodiments comprises synchronizing the slave and master counters that have come out of synchronization due to a drift between the slave and master clocks controlling them, by resetting the slave counter at a time when the master counter resets.

The respective counters of the master and slave count time based on ticks of their respective clock crystals. However, the master and slave clocks may operate at different frequencies to each other, in which counting the same amount of time does not mean counting the same number of clock ticks. Further in some embodiments, the slave clock is selectively based on one of two different crystals: a fast crystal in the order of tens of MHz when the slave is in a relatively high powered mode; and a slow crystal in the order of kHz when the slave is in a low powered mode. Thus, the slave may attribute something in the order of 1000 times more time for each tick in the low powered mode than in the high-powered mode.

In one or more embodiments the frame of the second type includes the master clock synchronization information. Hence, the slave device can use the master clock resynchronization information in each of the frames of the second type that it interacts with.

In one or more embodiments, when a threshold time since a last resynchronization of the slave clock is reached, the slave device is set to receive and process one or more frames wirelessly transmitted from the master device, and resynchronize the slave device to the master device based on a frame of said one or more frames, the frame being of the first type or the second type. Hence, when it has been some time since the slave device last wirelessly received a frame of the second type and therefore it has been some time since the slave device last synchronized, there is a danger that the slave clock has drifted too far out of synchronization with the master clock and therefore there is a possibility that the slave device will be set to the higher power mode to listen for a preamble extension in a wrong period and as a result it will (i) not detect a frame intended for it by not seeing the preamble, or if the drift is in the other direction (ii) detect a frame not intended to be detected by mistaking a common preamble for a preamble extension. To avoid this, each of the first and second type of frames carry the master clock synchronization information, and the slave device can be set in a higher power mode to receive and process a first or second frame type when a threshold time elapses since it was last synchronized.

In one or more embodiments, the threshold time is determined based on an estimate of a drift between the master clock and the slave clock and a duration of the preamble extension. In one or more embodiments, the slave device is set in a higher-powered mode to detect a preamble extension of a frame of the second type for a detection period, and the threshold time is determined based additionally on the detection period.

In one or more embodiments, the information contained in the second frame type can be intended to be wirelessly received by one or more slave devices and any slave device that detects the preamble extension can respond by wirelessly receiving and/or wirelessly transmitting information to and/or from the master device. Alternatively, in one or more embodiments, the information is wirelessly received from the master device and/or wirelessly transmitted to the master device by wirelessly receiving and processing a field in the frame of the second type to determine whether the slave device is to wirelessly receive and/or whether the slave device is to wirelessly transmit one or more payloads, wherein the processor is configured to control the slave device to wirelessly receive and/or wirelessly transmit one or more payloads as part of the wireless receiving of the information from the master device and/or the wireless transmitting of the information to the master device. In this manner, a slave device that detects the preamble extension reads all of the fields of the frame and only when an identifier of the slave device is contained is the field in present does the slave device go on to receive and/or transmit information to and/or from the master device. Hence, slave devices can be targeted with the frames of the second type using slave device identifiers.

In one or more embodiments, the one or more payloads are wirelessly received or wirelessly transmitted by wirelessly receiving and/or wirelessly transmitting one or more data frames that are separate to the frame of the second type and to any subsequent frames of the first or second type. Hence, the second frame type can simply indicate to the slave device that data will need to be wirelessly transmitted and/or wirelessly received to and/or from the master device in one or more following data frames. In order to conserve power, the slave device can be temporarily set to a low powered mode in a period between successive ones of said one or more separate frames and/or between a frame of said one or more separate frames and a frame of the second type. The slave device can be controlled for the wireless receiving of information from the master device and/or said wirelessly transmitting of information, during one, or over a plurality, of said known time frames.

In one or more embodiments, the slave device is controlled to wirelessly receive information from the master device a field of the frame of the second type that is absent from a frame of the first type. This provides for a combination of a synchronizing frame and a data frame.

In one or more embodiments, the preamble extension is detected by identifying a predefined sequence of symbols in the preamble extension. The predefined sequence of symbols in the preamble extension may be the same as a predefined sequence of symbols in the common preamble that is used to detect the common preamble.

In one or more embodiments, wirelessly receiving information from the master device and/or wirelessly transmitting information to the master device is by synchronous communication wherein the frames of at least the first type are usable by the slave device to maintain synchronization between the slave device and the master device for said synchronous communication. Additionally, the frames of the second type may also advantageously be usable to maintain the synchronization.

In one or more embodiments, the slave device is powered using a battery power supply.

In one or more embodiments, a master device is controlled to wirelessly transmit frames of a first and second type to at least one slave device. The frames of the first and second type have a common preamble and the frames of the second type have a preamble extension prior to the common preamble. The frames are wirelessly transmitted to the at least one slave device at a known periodicity within a known time frame based on a master clock. Information is wirelessly received from the at least one slave device and/or wirelessly transmitted to the at least one slave device based on a wireless transmission of a frame of the second type. The master device is for use with one or more slave devices as described above. When information is to be wirelessly transmitted to and/or wirelessly received from one or more slave devices, the master device generates a second type of frame for wireless transmission to the one or more slave devices to indicate to the slave devices that information is to be wirelessly received and/or wirelessly transmitted.

In one or more embodiments master clock synchronization information is wirelessly transmitted for use by at least one slave device to resynchronize the at least one slave device. The frames of the second type can include the master clock synchronization information and/or the frames of the first type can include the master clock synchronization information. In one or more embodiments, the master clock synchronization information is included in both the first and second type of frames so that it is available to the or each slave device at each frame period.

In one or more embodiments, the frame of the second type includes a field defining whether a slave device is to wirelessly receive and/or whether the slave device is to wirelessly transmit one or more payloads, and to control the master device to wirelessly receive and/or wirelessly transmit one or more payloads as part of the wireless receiving of the information from the slave device and/or the wireless transmitting of the information to the slave device. The field can comprise a slave identifier field that defines whether a slave device is being addressed by the master device to select the slave device for the wireless receiving and/or wireless transmitting of the one or more payloads. Hence the master device can select which one or more slave devices is to wirelessly receive information and/or wirelessly transmit information by identifying the slave device using a unique identifier in the slave identifier field of the second type of frame.

In one or more embodiments, the master device is controlled for wirelessly receiving of the one or more payloads from the slave device and/or said wireless transmitting of the one or more payloads over one or a plurality of said known time frames. Hence, more data may be wirelessly transmitted and/or wirelessly received than may be achieved during a single one of the time frames.

In one or more embodiments, the one or more payloads are wirelessly received and/or wirelessly transmitted by wirelessly receiving and/or wirelessly transmitting of one or more frames that are separate to the frame of the second type and to any subsequent frames of the first or second type. Such data frames can be wirelessly transmitted in between a frame of the first type that follow the frame of the second type and/or in between the frame of the second type and a frame of the first type.

In one or more embodiment, the master device is controlled to wirelessly transmit information to the at least one slave device in a field of the frame of the second type that is absent from a frame of the first type. Hence, the second frame can be modified to carry the data to be read by the one or more slave devices without requiring the slave devices to have to look for a separate data frame.

In one or more embodiments, the common preamble comprises a predefined sequence of symbols and a predefined sequence of symbols in the preamble extension is the same as the predefined sequence of symbols in the common preamble that is used to detect the common preamble.

In one or more embodiments, the master device is controlled to wirelessly receive information from the slave device and/or wirelessly transmit information to the slave device by synchronous communication wherein the frames of at least the first type are usable by the master device to maintain synchronization between a slave device and the master device for said synchronous communication. Additionally, the frames of the second type may also advantageously be usable to maintain the synchronization.

In one or more embodiments, the master device is controlled to wirelessly transmit frames of the first type only when no information is to be wirelessly received from the at least one slave device and/or wirelessly transmitted to the at least one slave device. Hence, the master device only wirelessly transmits frames of the second type when information is to be wirelessly received from and/or wirelessly transmitted to at least one slave device.

In one or more embodiments, the master device is for use in a security system and the or each slave device is a portable personal emergency device.

In one or more embodiments, a system comprises a master device as described above, and one or more slave devices as described above.

In one or mode embodiments, the system can comprise a first slave device and a second slave device. The respective first and second slave device can be controlled to wirelessly receive master clock synchronization information from the master device to use the master clock synchronization information to resynchronize the first and second slave devices independently based on different frames wirelessly transmitted from the master device. Hence, the master device can independently communicate with each slave device and independently resynchronize each slave device.

In one or more embodiments, the system provides for synchronous communication between a master device and slave devices in which the master device wirelessly transmits beacon frames for the resynchronization of any drift by the slave devices. In order to save power at the slave devices, the master device wirelessly transmits a different type of beacon frame when the beacon frame needs to indicate that one or more of the one or more slave devices is to wirelessly receive information from the master device or wirelessly transmit information to the master device or both. The different type of beacon frame includes a preamble extension that is wirelessly transmitted in a period prior to the regular wireless transmission of the rest of the beacon frame of the different type and the other beacon frames. This enables the slave devices to stay on a low power mode and only have to enter a higher power mode to look for the preamble extension in the period prior to the regular wireless transmission of the other beacon frames and the remainder of the beacon frame of the different type to decide whether to stay in the higher power mode for communication of information to and/or from the master device.

In embodiments, the system has the ability to dissociate the time at which beacon frames are sent to indicate that information is to be wirelessly transmitted to and/or wirelessly received from slave device(s) by the master device and the time at which the slave devices need to resynchronize by resetting their counters. Low-cost slave clocks can be used since in one or more embodiments, a greater drift can be compensated for by resynchronization periods that are shorter but still over many beacon periods e.g. every 100 beacons. In one or more embodiments, when a plurality of slave devices is present, they can perform their resynchronizations independently and at different times. In one or more embodiments, the waking up of the slave device(s) to wirelessly receive and/or wirelessly transmit data is controlled by the master device using the beacon frame of the second type, whereas the waking up of the slave device for synchronization of the slave clock is controlled by the slave device(s).

In one or more embodiments, the low powered mode may be a mode in which no wireless communication takes place, i.e., the slave device does not send or receive wireless transmissions. In one or more embodiments, in the low powered mode, the slave device does not send or receive wireless transmissions based on a communication protocol that uses the frames of the first and second type. In one or more embodiments, in a low power mode, the slave device may listen in a low duty cycle for some other signal (i.e. a signal other than a frame of the first or second type), such as for the identification of a signal using some other communication protocol.

In one or more embodiments, a slave device can be a reduced functional device and the master device can be a personal area network controller, analogous to IEEE 802.15.4 standard in one or more embodiments of the invention. The frame of the first type, the frame of the second type, and the data frame can each be a PPDU (Physical Layer Convergence Procedure (PLCP) protocol data unit), and the frame of the first type and a data frame may be consistent with that standard in one or more embodiments of the invention. Hence, the present invention is suited to a modification of the 802.15.4 standard, but the invention is not limited to such a standard.

Specific embodiments will now be described with reference to the drawings.

Figure 3:
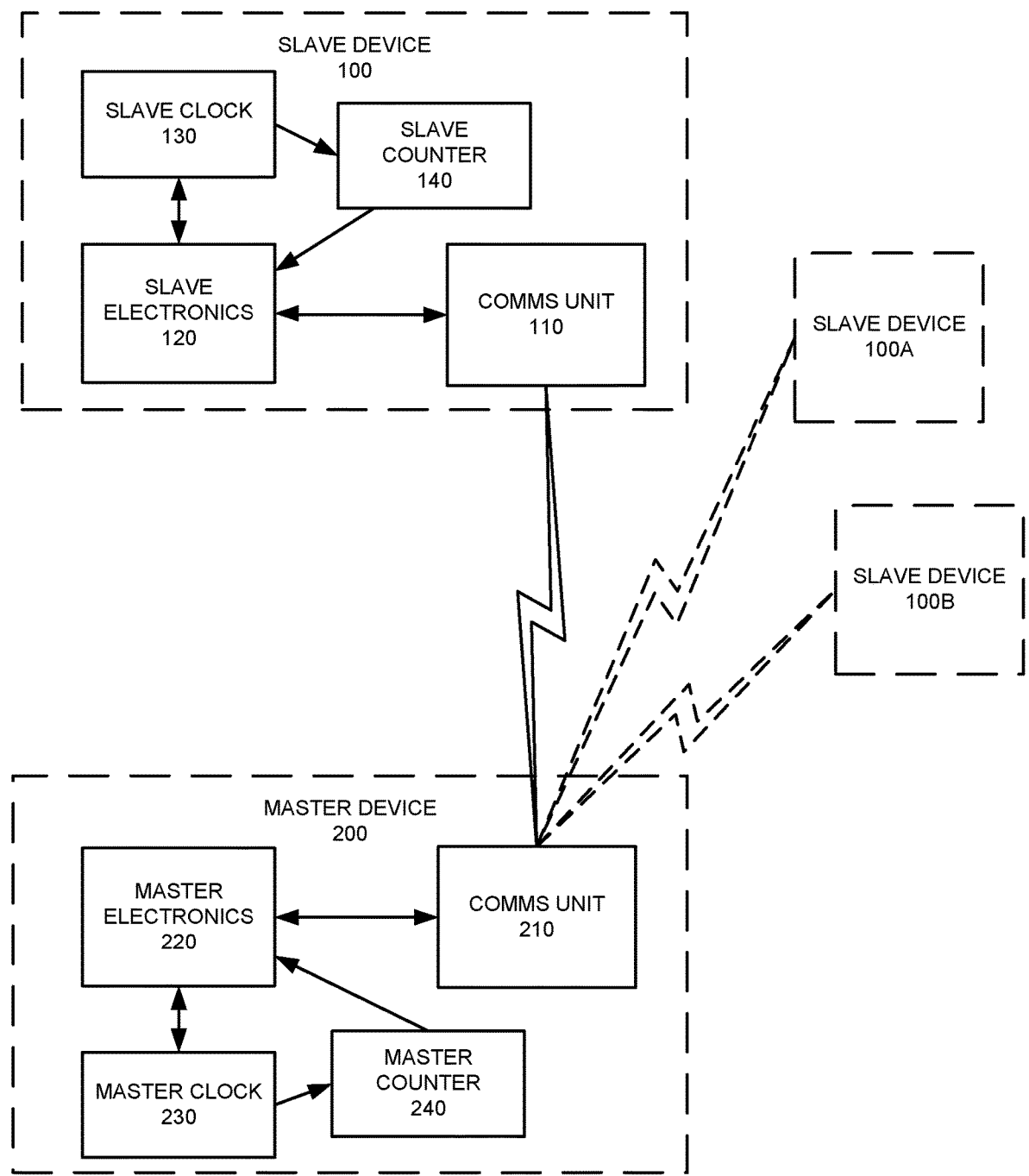
FIG. 3 is a schematic diagram illustrating a system comprising slave devices and a master device in accordance with one or more embodiments.

FIG. 3 is a schematic diagram illustrating a system in accordance with embodiments. The system comprises a master device 200 wirelessly connected to one or more slave devices 100, 100A and 100B. In this example three slave devices are illustrated. Any number can be used in wireless communication with the master device 200.

The master device 200 comprises a communications unit 210 for wireless transmission of frames (such as beacon frames, and data frames and/or other information containing frames) to one or more slave devices 100, 100A, 100*b* and receipt of frames (such as data frames and/or other information containing frames) from one or more slave devices 100, 100A, 100B. The master device 200 includes master electronics 220 for performing various functions of the master device including the generation of the beacon frames and data frames for transmission to one or more slave devices 100, 100A, 100B and the processing of data frames received from one or more slave devices 100, 100A, 100B. A master clock 230 is provided in the master device 200 for controlling the timing and duration of the transmission of the frames from the master device 200 by controlling a master counter 240. The master counter 240 controls the timing of the transmission of the frames based on reaching a certain count.

A slave device 100 comprises a communications unit 110 for wireless transmission of frames (such as data frames and/or other information containing frames) to the master devices 200 and receipt of frames (such as beacon frames, and data frames and/or other information containing frames) from the master device 200. The slave device 100 includes slave electronics 120 for performing various functions of the slave device including the generation of the data frames for transmission to the master device 200 and the processing of the beacon frames and data frames received from the master device 200. A slave clock 130 is provided in the slave device 100 for controlling the timing of the operation of the slave device 100. A slave counter 140 is provided for setting of the slave device 100 in a higher power mode for detection and processing of frames from the master device 200 when a count is reached, and the slave counter 140 is reset in response to received master clock resynchronization information. The slave counter 140 operates under the timing provided by the slave clock 130. The timing of the slave clock 130 can drift relative to the master clock 230 and hence a resetting of the slave counter 140 is required periodically in order for the slave counter 140 to synchronize to the master counter 240.

In IEEE 802.15.4, not only are beacon frames and acknowledgement frames communicable, information may be transmitted in frame types other than a "data frame" type, for example a "command frame" type. For simplicity the specification refers does not distinguish between data frames and other frames that are not beacon frames or ack frames, and merely calls all such frames as "data frames". However, for some embodiments, the term "data frame" can more specifically refer to a particular type of non-beacon, non-ack frame, for example a data frame in accordance with IEEE 802.15.4.

The master electronics 220 can be analogue or digital electronics or a combination of analogue and digital electronics. The digital electronics can be performed at least in part by a processor or microprocessor suitably programmed and/or otherwise configured.

The slave devices 100, 100A and 100B may comprise the same general components. However, the slave electronics 120 may be the same or different in different slave devices that perform different functions to each other. For example, in a security system, the slave devices may be proximity sensor, a motion sensor, or a camera for example. Each of these devices include electronics for performing their required functions. The electronics 120 will however have components in common relating to the resetting of the slave counter 140 and the control of the detection and processing of received frames and the transmission of frames.

The slave electronics 120 can be analogue or digital electronics or a combination of analogue and digital electronics. The digital electronics can be performed at least in part by a processor or microprocessor suitably programmed and/or otherwise configured.

The slave device 100, 100A, 100B can operate in at least one low power mode and at least one higher power mode. In one or more embodiments, in a low power mode, a processor and or the slave electronics 120 operates at a low power mode and in a higher power mode, the processor and or the slave electronics 120 operates at a high-power mode. There may be multiple low power modes and one high powered mode, multiple high-power modes and one low powered mode, one low powered mode and one high powered mode, or multiple high-powered mode and multiple low powered modes. Each of the lowered modes may be sleep modes. Each of the high-powered modes may be awake modes.

FIG. 4A illustrates a beacon frame structure which in this embodiment is a PPDU having a frame structure similar to a PPDU having a beacon MAC frame that is in accordance with the 802.15.4 standard. FIG. 4A shows the frame structure of a beacon frame of a first type transmitted by the master device in accordance with one embodiment. In this embodiment the preamble has been labelled the common preamble. The reasons for this will become apparent when the structure of a beacon frame of the second type is described below.

FIG. 4B illustrates a beacon frame structure which in this embodiment is a frame structure the same as the PPDU frame structure of FIG. 4A, with the exception of an additional preamble extension at the beginning of the frame. This is the frame structure of a beacon frame of a second type transmitted by the master device in accordance with one embodiment. In this embodiment the common preamble aligns with the common preamble of the first type of frame as shown in FIG. 4A. The preamble extension hence comprises an additional length of preamble at the beginning of the frame of the second type. Although the preamble extension is shown as a separate section of the frame in FIG. 4B, it can be formed from the same structure e.g. the same symbols as the common preamble and hence the boundary is purely notional. The boundary does however represent a point in time that the frame is transmitted. For both the first and the second type of frames, the start of the common preamble is transmitted at the same periodicity by the master device 200. This will become more apparent having regard to the discussion on FIG. 5 below.

The common preamble and the preamble extension can be formed of a known pattern of symbols or digits to enable recognition/detection by the slave device. For example, the preamble extension may be of a preset number of bits. In one or more embodiments, the common preamble and the preamble extension are each a series of symbols that toggle at a 50% duty cycle. The toggling symbols may respectively define 1's and 0's in a binary scheme, for example.

In FIG. 4A the relative sizes of the common preamble and the preamble extension are not to scale. The length of the preamble will be calculated in a manner discussed herein after with reference to FIG. 8.

A method using the beacon frames of the first and second type transmitted by the master device will now be described with reference to FIG. 5, which is a timing diagram from the perspective of a particular slave device 100.

The times of reception of the respective starts of the common preambles of the beacon frames from the master device 200 are indicated by arrows at T7 to T14 along the timeline. In these examples that the invention is applied to, personal wireless area networks are relatively short range. The time of flight delay between the master and the slave is therefore assumed to be negligible and that the time of transmission is therefore the same as the time of reception. The spacings of these are even, indicating a regular periodicity transmission of beacon signals by the master device. The common preambles of beacon frames BF7 to BF14 are received at times T7 to T14, respectively.

Figure 2:
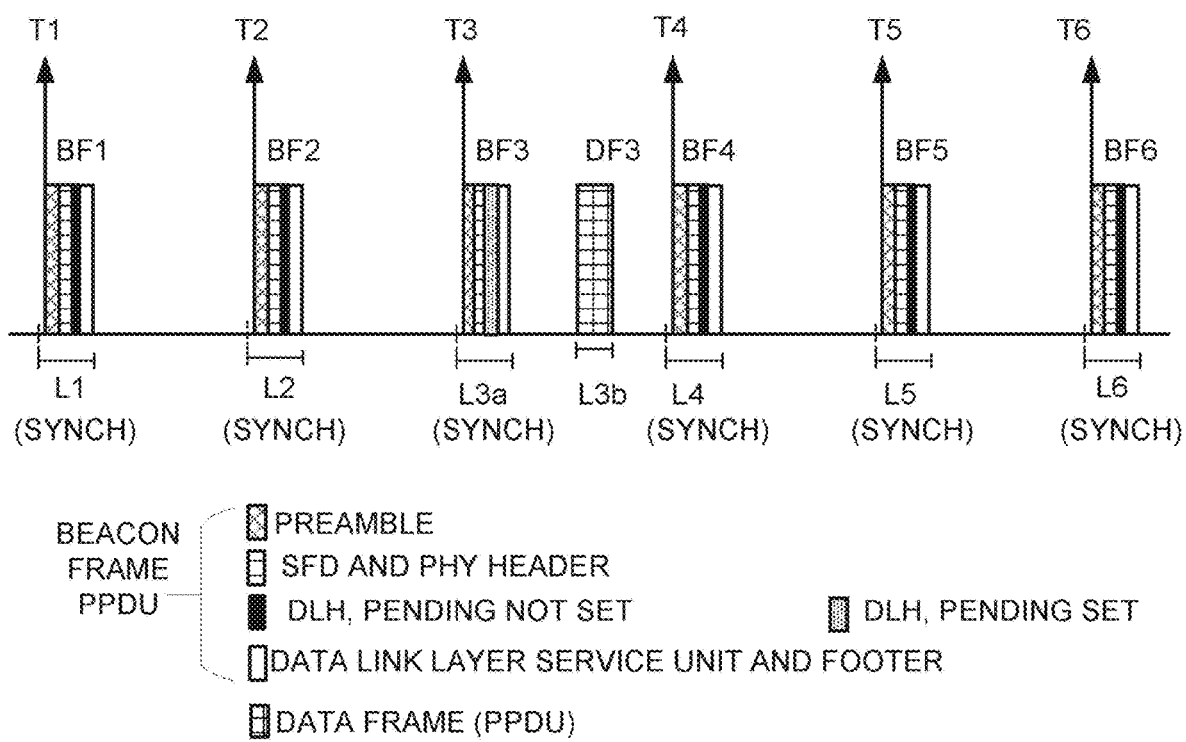
FIG. 2 is a schematic diagram illustrating a timing diagram for beacon frames received at a prior art slave device.
Figure 5:
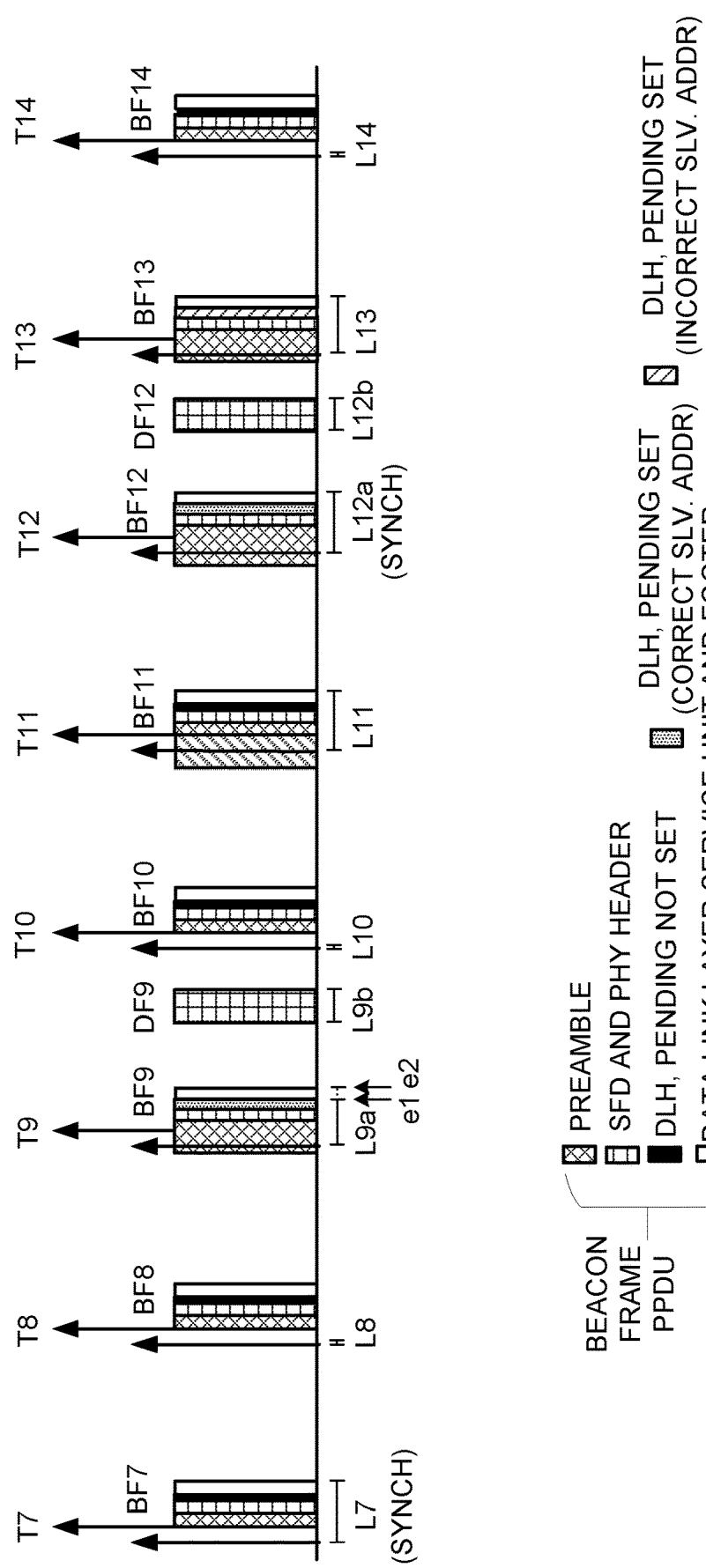
FIG. 5 is a schematic diagram illustrating a timing diagram for frames received by a slave device in accordance with one or more embodiments.

The key for the diagram of FIG. 5 indicates that the same beacon frame components are used as for the prior art structure of FIG. 2. However, the preamble for second type beacon frames is longer than that of first type beacon frames as discussed with reference to FIGS. 4A and 4B. FIG. 5 also illustrates something that is not part of the beacon, but is instead a signal transmitted from another device. Nonetheless, it may be detected as a preamble extension by the slave device. It may therefore be referred to as noise preamble, and will be explained below in more detail.

In this embodiment, the setting of the slave device in a higher mode for the detection of the frame by the detection of the preamble and the preamble extension is indicated by the smaller arrows just before the transmission/reception timing arrows T7 to T14. These arrows show that the slave device is set in the higher power mode at a time slightly before each of the transmission times T7 to T14 of the master device to listen for a preamble or preamble extension of a frame.

Each of the beacon frames BF7 to BF14 carry information for the slave devices to synchronize their perspective of time with that of the master device, for example by synchronizing respective counters on the master and slaves, the counter's counting of time based on ticks of their corresponding clocks. As it happens in the example of FIG. 5, the slave device 100 has determined that it needs to synchronize, at time T7, its counting with that of the master device. At time T7, a beacon frame of a first type is received with a common preamble starting at the time T7. The first type of beacon frame carries master clock synchronization information, and the slave 100 wakes itself to receive and synchronize to the beacon BF7, as indicated by the work SYNCH. In order to do this, the slave device has to be set into the higher power mode to catch at some predefined amount of the common preamble (e.g. at least 4 toggles of the preamble signal). For example, it could wake at time T7. However, in this example, the slave device awakes even earlier than that by waking for an initial period before the transmission time T7 and remaining awake for the length of the beacon frame: a total higher power period of L7. For the next transmission period T8, the slave device 100 is set in the higher power mode only for a short period of time indicated as L8 for the detection of a preamble extension. Since there is no preamble extension associated with this frame (it is a frame of first type as shown in FIG. 4A), the slave device can be returned to the low power mode since there is no information carried by the frame of first type BF8 that is for reception by the slave device and nor does the slave device 100 yet need to resynchronize.

At the next transmission period T9, a frame BF9 of the second type illustrated in FIG. 4B is transmitted by the master device. Frame BF9 is transmitted with the start of the common preamble at the transmission period T9 and the preamble extension in the period prior to T9. The period of transmission of the preamble extension coincides with the listening of the slave device and hence the slave device detects the preamble extension and hence that there is therefore presumably a frame of the second type that requires the slave device to either receive and/or transmit information to and/or from the master device. The slave device therefore stays in the higher power mode to listen to the frame for the period L9a. The information in the MPDU of the beacon frame BF9 also indicates that there is data following in a data frame DF9 for the slave device. This is indicated in this example by DLH pending portion being set to indicate pending data and the address for the slave device being correct. Hence, the slave device drops to a low power mode for the period between the end of the beacon frame to a transmission time either known by the slave device (e.g. a certain time after the beacon device) or at a transmission time (e.g. a designated time slot) indicated in the beacon frame and is then set to the higher power mode again to listen to the data frame DF9 for the period L9b. Additionally or alternatively, the information in the beacon frame may inform the slave of a time slot to transmit a data frame to the master.

In FIG. 5 two possible end points for the awake period L9a of the slave device are shown and labelled e1 and e2. The listening by the slave device could be just up to e1 i.e. up to the end of the pending field. However, in on preferred embodiment the end period is at e2, which is the end of the beacon. This is preferred because error checking data, such as CRC is usually located at the end of the frame and it is preferable to perform error checking on the detected frame contents and that way the slave device has more assurance that the frame has not been corrupted. Hence, for all of the beacon frames BF7, BF11, BF12 and BF13, the listening period L is shown as being until the end of the frame, for example because the pending portion is not set to indicate pending data and or because there is pending data but that it is not indicated as being for that slave device.

In the next transmission period T10, a frame of the first type is transmitted by the master devise and hence the slave device follows the same operation as for the transmission period T8 and only listens for a short period L10 before returning to the low power mode.

In the transmission period T11, a frame BF11 of the first type is transmitted by the master device but noise occurs at the point of the preamble extension just before the transmission time T11. In this case the noise causes a false detection of a preamble by the slave device and hence it stays in the higher power mode for the period of the frame, L11 until it detects that there is no information for it in the frame.

In the transmission period T12 a frame of the second type is transmitted by the master device and hence the slave device follows the same operation as for the transmission period T9 to set the slave device in the higher power mode for the reading of the frame over period L12a and the reading of a following data frame DF12 for the period L12b. In addition, this frame includes master frame synchronization information and the slave device requires resetting of the slave counter at this point. Hence, a resetting of the slave counter takes place at this period.

In general, in accordance with one or more embodiment, all of the frames of the first and second type include master clock resynchronization information so this it is available to the slave device whenever it is required by the slave device. It is up to the slave device to determine when to reset the slave counter. If the slave device has received a beacon frame of the second type recently, it can use the master clock synchronization information in it to reset the slave counter. However, if the transmitted beacon frames are only of the first type for a period of time, during that period of time, the slave device only wakes up to go to the higher power mode for a very short period at the point shortly before the transmission time of each beacon frame. The timing of the wake up is governed by the slave counter. After a period, the slave counter may drift out of synchronization with the master counter and there is a danger that the slave device will wake up at the wrong time and miss the detection of the preamble extension of a beacon frame of the second type or wake up potentially unnecessarily by detecting a normal preamble and mistake it to be a preamble extension. To avoid this, the slave device can determine a time since the last resynchronization by a slave counter reset, and if this is above a threshold, it can wake up to detect the whole of a next beacon frame even if it is a beacon frame of the first type. The details of the method for this will be described in more detail hereinafter. The type of synchronization is illustrated in FIG. 5 for the beacon frame BF7. In this example the slave also determines it needs to resynchronize using beacon frame BF12. Although the resynchronization is shown in FIG. 5 only for using the beacon frame BF12, beacon frame BF9 may optionally also be used for resynchronization since the slave device in any case wakes up to receive it since it is a beacon frame of the second type. In this way, even if there has not been a significant drift in the timing of the slave counter by the time BF9 is detected, the early resynchronization avoids a later earlier drift of the synchronization. This could therefore be considered as an unnecessary synchronization.

Hence, for resynchronization by resetting of the slave counter, any of the beacon frames of the first and second type can be used and the detection of the preamble extension is only used to identify that there is possibly a message for the slave device in the beacon frame (subject in one embodiment to a slave address carried in the beacon frame matching the slave address of the slave).

At the next transmission period T13, a frame BF13 of the second type illustrated in FIG. 4B is transmitted by the master device. Frame BF13 is transmitted with the start of the common preamble at the transmission period T13 and the preamble extension in the period prior to T13. The period of transmission of the preamble extension coincides with the listening of the slave device and hence the slave device detects the preamble extension and hence that there is a frame of the second type that requires the slave device to either receive and/or transmit information to and/or from the master device. The slave device therefore stays in the higher power mode to listen to the frame for the period L13. The information in the MPDU of the beacon frame indicates that there is no data for that slave device. This is indicated in this example by DLH pending being set and but address for the slave device not being correct. Hence, the slave device returns to the low power mode after the period L13.

At the next transmission period T14, the slave device is set in the higher power mode only for a short period of time indicated as L14 for the detection of a preamble extension. Since there is no preamble extension associated with this frame (it is a frame of first type as shown in FIG. 4A), the slave device can be returned to the low power mode since there is no information carried by the frame of first type BF14 that is for reception by the slave device.

The timeline of FIG. 5 illustrates a number of principles for the use by the slave device of the beacon frames of the first and second type generated by the master device. Two slave clock synchronization events are illustrated: one using a frame of a first type and one using a frame of a second type. It will be noted that there are multiple transmission periods between the synchronizations rather than synchronizing every frame as in the prior art method discussed with reference to FIG. 2. This is a reduction in processing that saves power and is indicated by the fact that the time period that the slave device is at a higher power is much shorter than in the prior art method as indicated by the very short periods L8 and L10 for example.

Although in FIG. 5 the transmission of data from the master device to the slave device is illustrated, the beacon frames can signal to the slave device to not just receive information but instead to transmit information to the master device, or to perform both reception and transmission of information.

As shown in FIG. 5, the common preamble part of the beacon frames of the first and second types are transmitted at the same periodicity/regularity. It is only the preamble extension that is transmitted in a period prior to the regular transmission period. The length of the preamble extension is a factor in determining how often the slave device needs to wake up to resynchronize when it has not recently (i.e. within a threshold time) received a beacon frame. A longer preamble extension provides a greater degree of flexibility for the error in synchronization. However, the preamble extension consumes bandwidth which can be used for the transmission of information to and from the slave devices i.e. a data frame or number of data frames transmitted between two beacon frames may otherwise clash in time with a long preamble extension. The other factor that effects the preamble extension length is a predictable amount of drift of the slave clock(s), for example an expected worst-case drift.

The example of FIG. 5 illustrates a number of different types of beacon frames in one timeline. The invention is not limited to any particular pattern or order of the types of beacon frames or to the frames used for resynchronization by the slave device(s). The different beacon frames have been included in FIG. 5 simply to illustrate the different types of beacon frames that the master device can transmit and the ways in which slave devices can respond.

In the prior art method described with reference to FIG. 2, since the slave device reads every beacon frame, the slave counter is reset at the periodicity of the beacon frame. In one or more embodiments, the slave device does not read each beacon and hence the slave counter is not reset at each beacon frame. Instead, in one or more embodiments, the counter is a cyclical counter that restarts when it reaches a certain or predetermined number associated with the expected periodicity of the beacon frame based on the control by the slave clock. Hence, instead of a reset at each beacon frame caused by the received beacon frame as in the prior art, the slave device restarts the slave counter after completing a complete count or cycle that the slave device assumes matches a beacon cycle. This is repeated for until an extended preamble in a beacon frame is detected or until a threshold time is reached and a resynchronization is forced due to an expected or likely threshold drift between the slave and master clocks.

Figure 6:
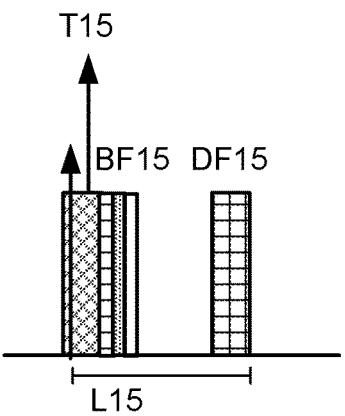
FIG. 6 is a schematic diagram illustrating the timing of a second type of frame in accordance with one or more embodiments.

FIG. 6 is a schematic diagram of a timing diagram for a beacon frame of a second type, showing the master device transmission time T15 and the slave device listening start point indicated by the arrow just before the transmission time T15.

A frame BF15 of the second type illustrated in FIG. 4B is transmitted by the master device. Frame BF15 is transmitted with the start of the common preamble at the transmission period T15 and the preamble extension in the period prior to T15. The period of transmission of the preamble extension coincides with the listening of the slave device and hence the slave device detects the preamble extension and hence that there is a frame of the second type that requires the slave device to either receive and/or transmit information to and/or from the master device. The slave device therefore stays in the higher power mode to listen to the frame. The information in the beacon frame indicates that there is data following in a data frame DF15 for the slave device. This is indicated in this example by DLH pending being set and the address for the slave device is correct. Hence, the slave device stays in the higher power mode to listen to the data frame DF15 for the period L15.

The method illustrated in FIG. 6 differs from the method of processing the beacon frame BF9 and the associated data frame DF9 in FIG. 5, in that in the period between the beacon frame and the data frame in this embodiment, the slave device stays in the higher power mode, wherein in the method of processing the beacon frame BF9 in FIG. 5 the slave device returns to the low power mode in the period between the beacon frame BF9 and the data frame DF9.

Figure 7:
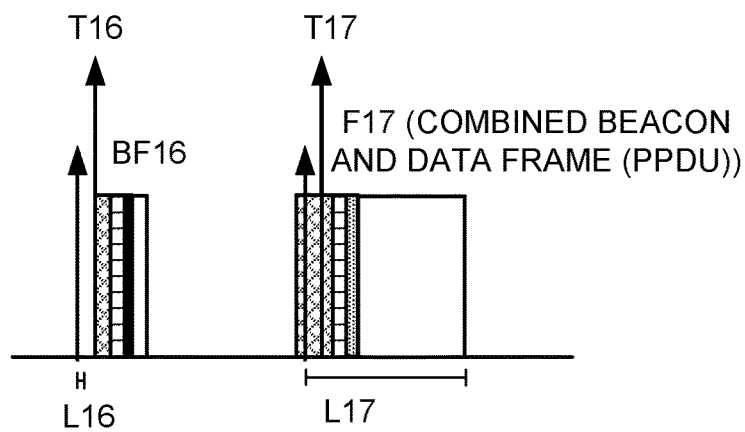
FIG. 7 is a schematic diagram illustrating the timing of a second type of frame in accordance with another one or more embodiments.

FIG. 7 is a schematic diagram of a timing diagram for a beacon frame BF17 of a second type after transmission of a beacon frame BF16 of a first type.

The beacon frame of the first type BF16 does not include a preamble extension and hence, when the slave device is set in the higher power mode to listen, it does not detect a preamble extension and hence the slave device returns to the low power mode. This means that the slave device is only in a higher power mode for a short period L16.

At transmission period L17, the master device transmits a PPDU frame F17 that is a combination of a beacon frame and data frame, wherein a beacon part precedes a data payload part. In the context of such a combined frame it will be understood that reference herein to a "data payload" or "data payload part" does not imply that it is the only "payload" in the frame. For example, it may be referring to information that does not relate to beacon functions, and which is therefore not includable in what is normally termed a "beacon payload", such as a "beacon payload" in a beacon frame of the first type and/or in accordance with IEEE 802.15.4.

Hence, frame F17 is transmitted with the start of the common preamble at the transmission period T17 and the preamble extension in the period prior to T17. The period of transmission of the preamble extension coincides with the listening of the slave device and hence the slave device detects the preamble extension and hence that there is a frame of the second type that requires the slave device to either receive and/or transmit information to and/or from the master device. The slave device therefore stays in the higher power mode to listen to the frame. The information in the beacon part of the frame indicates that there is a data payload following in the frame and hence the slave device stays in the higher power mode for the whole of the PPDU frame (period L17) to receive the data payload frame within it.

Figure 8:
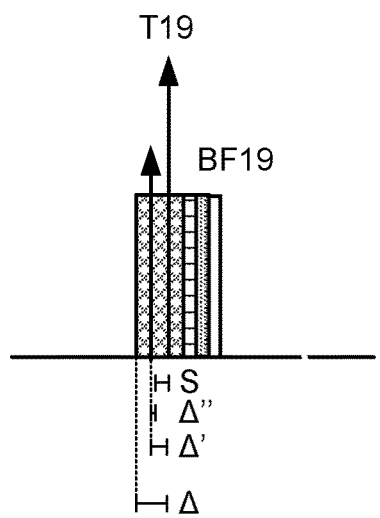
FIG. 8 is a schematic diagram illustrating the calculations of the period before the transmission time of the beacon frame for the slave device to listen in accordance with one or more embodiments.

FIG. 8 is a schematic diagram illustrating the various metrics relevant to one or more embodiments of the present invention. The figure shows a beacon frame BF19 of the second type, having a common preamble starting at T19.

The end of the period of listening for the preamble extension should be earlier than the start of the common preamble, taking into account the amount of potential drift of the slave counter relative to the master counter, which can push the common preamble towards that listening period. This way the slave device will not get woken up by a beacon frame of the first type. The amount of time (assuming no drift) between the end of the listening period is marked as 'S' in FIG. 8.

On the other hand, the drift could be in the other direction, such that if there is too much drift the listening period may start, and perhaps even finish, before the preamble extension, and therefore not detect a frame of the second type. The length of the preamble extension (marked $\Delta''$ in FIG. 8) therefore needs to be at least twice the duration of S, plus the minimum period needed for preamble detection. The minimum period needed for detection of a preamble is known in the art. It may, for example, be four bits if the preamble value toggles after every bit.

However, the preamble extension cuts into time that may otherwise be allocated for other frame transmissions (e.g. data frames). This sets a practical upper limit on the maximum duration of the preamble extension is limited by such a consideration. For example, the preamble extension may in some embodiments be less than 5% or in some embodiments, less than 2%, or in some embodiments less than 1%, of the time frame T that is the reciprocal of the periodicity of the beacon frames.

The duration of the period of listening (marked $\Delta''$ in FIG. 8) may be the minimum period needed for preamble detection. Taking these factors into account, the amount of time before the common preamble at which commences the period of listening for the preamble extension is marked as $\Delta'$ in FIG. 8.

The potential drift, D, away from master and slave synchronization is calculable by summing a known drift associated with the master clock and a known drift associated with the slave clock. Thus, based on the drift D the slave device can calculate how long it will be before the period of listening for the preamble extension has potential to arrive too earlier (e.g. before the preamble extension) or too late (e.g. during the common preamble). In this way the slave device can calculate the maximum time to allow between resynchronization events. Once such a time has elapsed since the last synchronization event the slave device wakes up to listen for the next beacon frame (regardless of whether or not is of the first or second type) and resynchronizes based on that beacon frame. Since the frequency of the beacon frames is known, the slave can determine the number of frames N that may pass before resynchronization is required.

Figure 9:
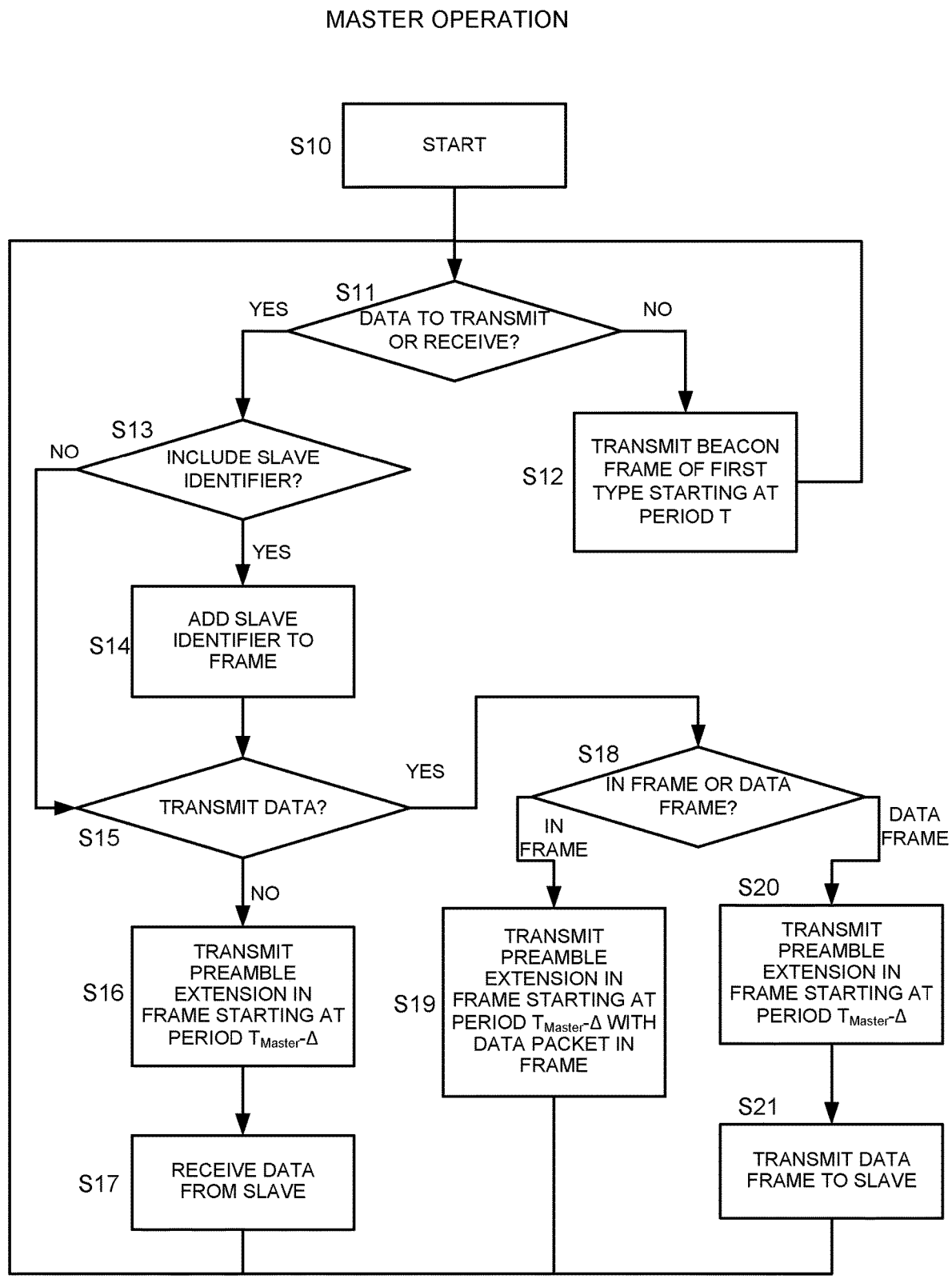
FIG. 9 is a flow diagram illustrating a method of operation of a master device in accordance with one or more embodiments.

FIG. 9 is a flow diagram illustrating a method of operation of a master device in accordance with one or more embodiments.

The process starts at step S10 and at step S11 the master device determines whether there is data/information to be transmitted to and/or received from one or more slave device. If there is no data/information to be transmitted to and/or received, in step S12 a beacon frame of a first type is transmitted at period T, i.e. with the preamble starting at T, and the process returns to step S11. Hence, this process is repeated every beacon period.

If in step S11 it is determined that there is data/information to be transmitted to and/or received from one or more slave device, in step S13 it is determined whether a slave identifier is to be included in the beacon frame. If so in step S14 a slave identifier is added to the beacon frame and the process then determines whether the master device is to transmit data/information in step S15 or not. If a slave identifier is not to be included in the beacon frame, in step S13, the process jumps to step S15.

If data/information is not to be transmitted (in other words data is expected to be received from one or more slave devices), in step S16 a preamble extension is transmitted at the beginning of the beacon frame of the second type at a period $T_{Master}-\Delta$. In step S17 data/information is received from one or more slave devices and the process returns to step S11. The data/information can be received from one or more slave devices as one or more data frames, such as PPDU frames. The receipt of a plurality of frames from the one or more slave devices can extend over more than one beacon period and they can be sent in the periods between beacon frames.

In step S15, if it is determined that data/information is to be transmitted, in step S18 the process determined whether the data/information is to be transmitted in a beacon frame or as one or more separate data frames. If the data/information is to be transmitted in the beacon frame, in step S19 a preamble extension is transmitted at the beginning of the beacon frame of the second type at a period $T_{Master}-\Delta$ with the data/information in the beacon frame and the process then returns to step S11. If the data/information is to be transmitted in one or more separate data frames, in step S20 a preamble extension is transmitted at the beginning of the beacon frame of the second type at a period $T_{Master}-\Delta$ with a field in the beacon frame set to indicate one or more following data frames and in step S21 one or more data frames are transmitted to the one or more slave devices. The process then returns to step S11.

Although only reception or transmission of data/information from one or more slave devices is illustrated in in FIG. 9, in one embodiment both transmission and reception of data between the one or more slave devices and the master device takes place. This can be achieved, for example, by the beacon allocating a time slot for receiving data and another time slot for transmitting data.

In the embodiment illustrated in FIG. 9, the master device can select to transmit the data/information either in the beacon frame or in one or more data frames (Step S18). In alternative embodiments, the master device is able to only transmit data/information in the beacon frame or in one or more data frames and not both selectively. For example, in some embodiments transmission of data payload information is always in one or more PPDU frames that are separate from the beacon frame.

In the embodiment of FIG. 9, the steps of determining whether to add a slave device identifier are included. However, in an alternative embodiment, steps S13 and S14 may be omitted.

Figure 10:
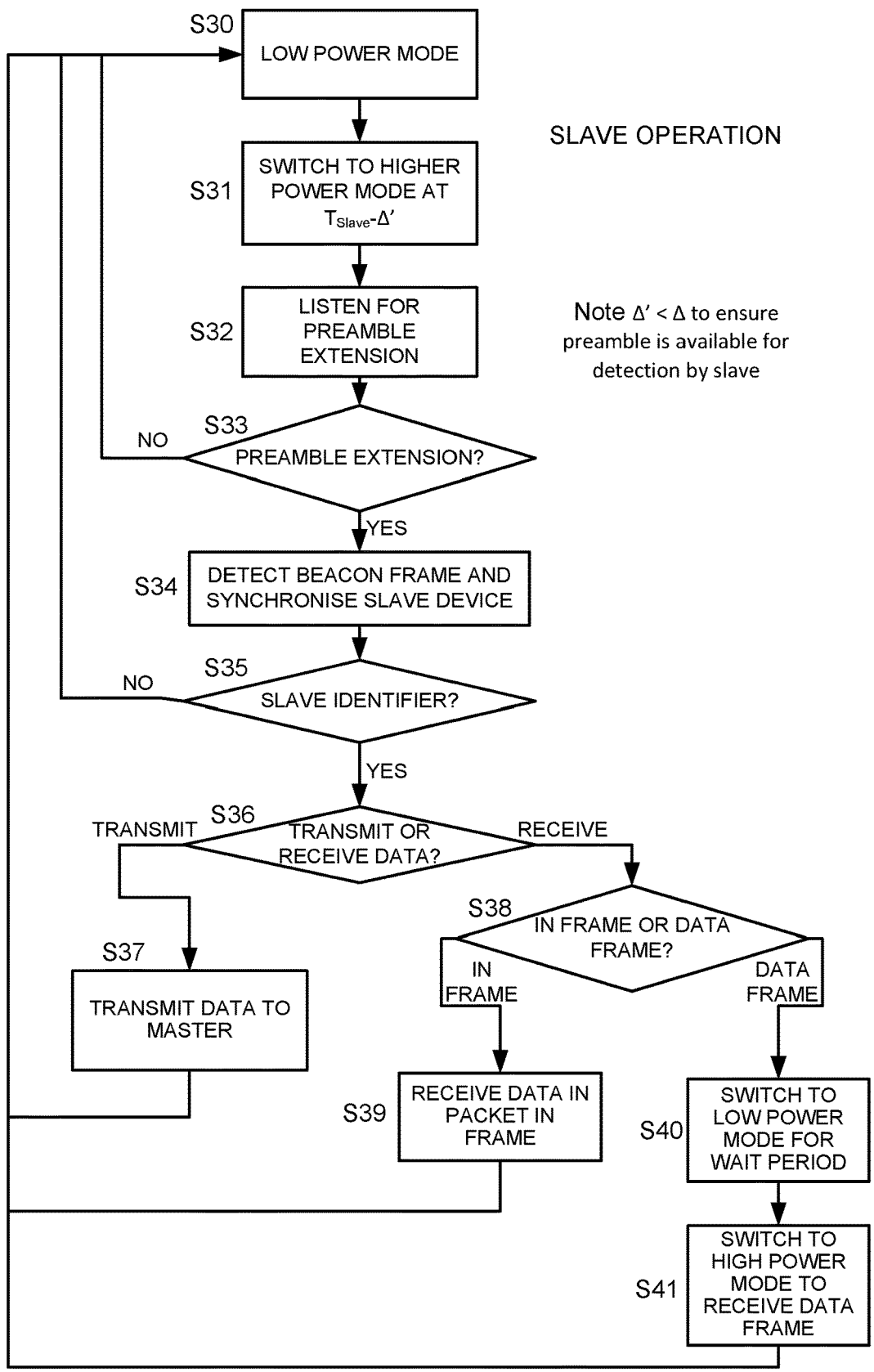
FIG. 10 is a flow diagram illustrating a method of operation of a slave device in accordance with one or more embodiments.

FIG. 10 is a flow diagram illustrating a method of operation of a slave device in accordance with one or more embodiments.

In step S30 the slave device is operating in a low power mode. In step S31 the slave device switches to a higher power mode at a time $T_{Slave}-\Delta'$ to listen for a preamble extension in step S32.

In step S33 the slave device determines whether the preamble extension has been detected and if not, the process returns to step S30. If the preamble extension is detected in step S33, in step S34 the beacon frame of the second type is detected and in this embodiment the slave uses the beacon to resynchronization. Such a resynchronization may be unnecessary if the slave counter was only recently reset. However, an early resynchronization pushes the next time a resynchronization further away even if only for a short period. However, in an alternative embodiment, the resynchronization may not automatically take place when a beacon is received unless a threshold time has passed since the last synchronization in order to avoid unnecessary resynchronizations by resetting of the slave counter.

In step S36 the slave device determines whether the beacon frame identifies that the slave device is to transmit or receive data/information. If data/information is to be transmitted, in step S37 the slave device generates one or more data frames and transmits the one or more data frames to the master device. If data/information is to be received, in step S38 the slave device determines whether it is received in a common frame with the beacon or in one or more separate data frames. If the data/information is to be received in a common frame with the beacon frame, in step S39, the slave device listens for the data packet in the frame and then the process returns to step S30 to return the slave device to a low power mode.

If in step S38 the slave device determines that the data/information is to be received in one or more data frames, in step S40, the slave device switches to low power mode to wait a period for a data frame that will arrive at a time slot defined in the beacon. At the end of that period, the slave device wakes up and switches to a higher power mode in steps S41 to listen for the data frame. The process returns to step S30 to return the slave device to a low power mode.

Although only reception or transmission of data/information from the master device is illustrated in in FIG. 10, in one embodiment both transmission and reception of data between the slave device and the master device takes place, for example having a transmission time slot and reception time slot for respective frames to be transmitted/received.

In the embodiment illustrated in FIG. 10, the slave device receives the data/information either in the beacon frame or in one or more data frames. In alternative embodiments, the slave device is able to only receive data/information in the beacon frame or in one or more data frames and not both selectively. For example, in some embodiments transmission of data payloads are always in one or more PPDU frames that are separate from the beacon frame.

In the embodiment of FIG. 10, the step of determining whether a slave device identifier is included in the beacon frame (step S35) can be omitted.

Figure 11:
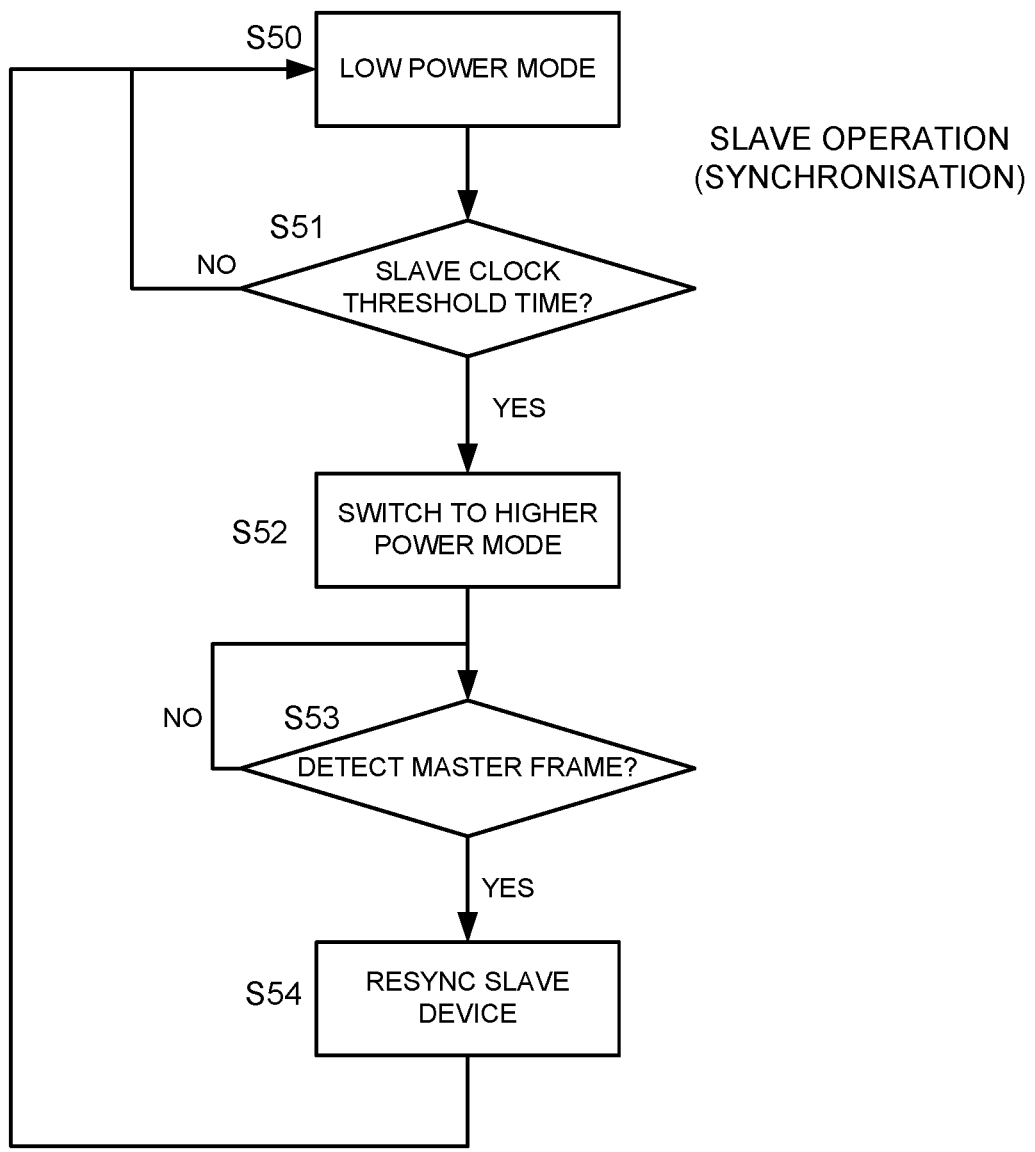
FIG. 11 is a flow diagram illustrating a method of operation of a slave device for the resynchronization of the slave clock in accordance with one or more embodiments.

FIG. 11 is a flow diagram illustrating a method of operation of a slave device for resynchronization by the resetting of the slave counter in accordance with one or more embodiments. The method of FIG. 11 may in conjunction with the method FIG. 10, for example be being executed between steps S30 and S31 of the method of FIG. 10.

In step S50 the slave device is operating in a low power mode. In step S51 the slave device determines whether a threshold time has passed. The threshold time is a threshold time since the slave device last performed a resynchronization using master clock information from the master device. If the threshold time has not passed, the process returns to step S50. If the threshold time has passed, in step S52 the slave device switches to a higher power mode to listen for a beacon frame of either the first or second type. The process then waits in step S53 to detect a master frame that functions at least as a beacon (which in the examples herein is a beacon frame of the first or second type). When such a master frame is detected in step S53, the slave device synchronizes to the master device based on based on that in step S54. The synchronizing may be achieved for example by resetting a counter that is based on the slave clock, wherein actions taken by the slave device are based on timing derived from the counter.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A slave device for, in accordance with a communication protocol, receiving frames of a first and second type that are used by the communication protocol, the frames being of the first and second type having a common preamble and being wirelessly transmitted from a master device at a known periodicity and within a known time frame, wherein an amount of time between respective starts of the common preambles of successive frames of the first type or second type is fixed so that the starts of successive common preambles of the frames of the first or second type occur at a fixed periodicity, the frames of the second type having a preamble extension prior to the common preamble, the slave device comprising:
   a processor configured to maintain the slave device in at least one low powered mode relative to at least one higher powered mode, and periodically sets the slave device in a higher powered mode of the at least one higher powered mode to receive and process the frames of the first or second type wirelessly transmitted from the master device in accordance with the protocol; and
   a slave clock;
   wherein the processor is configured to:
   based on the slave clock, set the slave device in a higher-powered mode of the at least one higher powered mode in a period prior to an expected wireless transmission of the common preamble of each frame from the master device to detect the preamble extension of a frame of the second type in the period prior to the expected wireless transmission of the common preamble;
   return the slave device to a low powered mode of the at least one low powered mode when no preamble extension is detected in the period prior to the expected wireless transmission of the common preamble; and
   control the slave device to wirelessly receive information from the master device and/or wirelessly transmit information to the master device when the preamble extension is detected in the period prior to the expected wireless transmission of the common preamble, and return the slave device to the low powered mode of the at least one low powered mode after the information has been wirelessly received and/or wirelessly transmitted,
   wherein the processor is configured to detect the preamble extension by identifying a predefined sequence of symbols in the preamble extension, and wherein beacon frames transmitted by the master device are received by the slave device for resynchronization of any drift by the slave device, wherein the beacon frames comprise the frames of the second type.

2. A slave device of claim 1, wherein the processor is configured to:
   when a threshold time based on the slave clock since a last resynchronization of the slave device is reached, set the slave device to wirelessly receive and process one or more frames wirelessly transmitted from the master device, and resynchronize the slave device to the master device based on a frame of said one or more frames, the frame being of the first type or the second type.

3. A slave device of claim 1, wherein the controlling of the slave device to wirelessly receive information from the master device and/or wirelessly transmit to the master device comprises wirelessly receiving and processing a field in the frame of the second type to determine whether the slave device is to wirelessly receive and/or whether the slave device is to wirelessly transmit one or more payloads, wherein the processor is configured to control the slave device to wirelessly receive and/or wirelessly transmit one or more payloads as part of the wireless receiving of the information from the master device and/or the wireless transmitting of the information to the master device, wherein the field comprises a slave identifier field that defines whether the slave device is being addressed by the master device to select the slave device for the wireless receiving and/or wireless transmitting of the one or more payloads.

4. A slave device of claim 1, wherein the processor is configured to control the slave device for said wireless receiving of information from the master device and/or said transmitting of information over a plurality of said known time frames.

5. A slave device of claim 1, wherein in the low powered mode to which the slave device returns when no preamble extension is detected in the period, the slave device does not send or receive wireless transmissions.

6. A slave device of claim 1, wherein the processor is configured to control the slave device to wirelessly receive information from the master device and/or wirelessly transmit information to the master device by synchronous communication wherein the frames of at least the first type are usable by the slave device to maintain synchronization between the slave clock and a master clock of the master device for said synchronous communication.

7. A method at a slave device for, in accordance with a communication protocol, receiving frames of a first and second type that are used by the communication protocol, the frames being of a first and second type having a common preamble and being wirelessly transmitted from a master device at a known periodicity and within a known time frame, wherein an amount of time between respective starts of the common preambles of successive frames of the first type or second type is fixed so that the starts of successive common preambles of the frames of the first or second type occur at a fixed periodicity, the frames of the second type having a preamble extension prior to the common preamble, the method comprising:
  maintaining the slave device in at least one low powered mode relative to at least one higher powered mode;
  periodically setting the slave device in a higher-powered mode of the at least one higher powered mode to receive and process frames of the second type wirelessly transmitted from the master device in accordance with the protocol;
  wherein the slave device is set in the higher-powered mode based on a slave clock in a period prior to an expected wireless transmission of the common preamble of each frame from the master device to detect the preamble extension of a frame of the second type in the period prior to the expected wireless transmission of the common preamble;
  the slave device is returned to a low powered mode of the at least one low powered mode when no preamble extension is detected in the period prior to the expected wireless transmission of the common preamble; and
  the slave device is controlled to wirelessly receive information from the master device and/or wirelessly transmit information to the master device when the preamble extension is detected in the period prior to the expected wireless transmission of the common preamble, and return the slave device to the low powered mode of the at least one low powered mode after the information has been wirelessly received and/or wirelessly transmitted,
  wherein the preamble extension is detected by identifying a predefined sequence of symbols in the preamble extension, and wherein beacon frames transmitted by the master device are received by the slave device for resynchronization of any drift by the slave device, wherein the beacon frames comprise the frames of the second type.

8. A master device comprising:
  a processor configured to control the master device, in accordance with a communication protocol, to wirelessly transmit frames of a first and second type that are used by the communication protocol to at least one slave device, the frames of the first and second type having a common preamble, wherein the processor is configured to wirelessly transmit the frames being of the first and second type to the at least one slave device at a known periodicity and within a known time frame; and
  a master clock for defining the known periodicity and time frame;
  wherein to operate in accordance with the communication protocol the processor is configured to control the master device to wirelessly receive information from the at least one slave device and/or wirelessly transmit information to the at least one slave device based on a wireless transmission of a frame of the second type,
  wherein the common preamble after a preamble extension comprises a predefined sequence of symbols, wherein an amount of time between respective starts of the common preambles of successive frames, including frames of the first type and frames of the second type, is fixed, and the frames of the second type have the preamble extension prior to the common preamble,
  wherein the master device wirelessly transmits beacon frames for resynchronization of any drift by the at least one slave device, wherein the beacon frames comprise the frames of the first type and of the second type, wherein the slave device is configured to:
    maintain the slave device in at least one low powered mode relative to at least one higher powered mode, and periodically sets the slave device in a higher powered mode of the at least one higher powered mode to receive and process the frames of the first or second type wirelessly transmitted from the master device in accordance with the protocol;
    based on the slave clock, set the slave device in a higher-powered mode of the at least one higher powered mode in a period prior to an expected wireless transmission of the common preamble of each frame from the master device to detect the preamble extension of a frame of the second type in the period prior to the expected wireless transmission of the common preamble;
    return the slave device to a low powered mode of the at least one low powered mode when no preamble extension is detected in the period prior to the expected wireless transmission of the common preamble; and
    control the slave device to wirelessly receive information from the master device and/or wirelessly transmit information to the master device when the preamble extension is detected in the period prior to the expected wireless transmission of the common preamble, and return the slave device to the low powered mode of the at least one low powered mode after the information has been wirelessly received and/or wirelessly transmitted.

9. A master device of claim 8, wherein the processor is configured to control the master device to wirelessly transmit the frame of the second type to include a field defining whether a slave device is to wirelessly receive and/or whether the slave device is to wirelessly transmit one or more payloads, and to control the master device to wirelessly receive and/or wirelessly transmit one or more payloads as part of the wireless receiving of the information from the slave device and/or the wireless transmitting of the information to the slave device, wherein the field comprises a slave identifier field that defines whether a slave device is being addressed by the master device to select the slave device for the wirelessly receiving and/or wirelessly transmitting of the one or more payloads.

10. A master device of claim 9, wherein the processor is configured to control the master device to wirelessly receive and/or wirelessly transmit the one or more payloads by wirelessly receiving and/or wirelessly transmitting of one or more frames that are separate to the frame of the second type and to any subsequent frames of the first or second type.

11. A master device of claim 10, wherein the processor is configured to control the master device for said wireless receiving of information from the slave device and/or said wireless transmitting of information over a plurality of said known time frames.

12. A master device of claim 8, wherein the processor is configured to control the master device to wirelessly receive information from the slave device and/or wirelessly transmit information to the slave device by synchronous communication wherein the frames of at least the first type are usable by the master device to maintain synchronization between a slave clock and the master clock for said synchronous communication.

13. A master device of claim 8, wherein the processor is configured to control the master device to wirelessly transmit frames of the first type only when no information is to 14. A method at a master device comprising:
controlling the master device, in accordance with a communication protocol, to wirelessly transmit frames of a first and second type that are used by the communication protocol to at least one slave device, the frames of the first and second type having a common preamble;
wherein the frames being of the first and second type are wirelessly transmitted to the at least one slave device at a known periodicity and within a known time frame based on a master clock of the master device; and
information is wirelessly received, in accordance with the communication protocol, from the at least one slave device and/or wirelessly transmitted to the at least one slave device based on a wireless transmission of a frame of the second type, wherein the common preamble after a preamble extension comprises a predefined sequence of symbols, wherein an amount of time between respective starts of the common preambles of successive frames, including frames of the first type and frames of the second type, is fixed, and the frames of the second type have the preamble extension prior to the common preamble,
wherein the master device wirelessly transmits beacon frames for resynchronization of any drift by the at least one slave device, wherein the beacon frames comprise the frames of the first type and of the second type, wherein the slave device is configured to:
maintain the slave device in at least one low powered mode relative to at least one higher powered mode, and periodically sets the slave device in a higher powered mode of the at least one higher powered mode to receive and process the frames of the first or second type wirelessly transmitted from the master device in accordance with the protocol;
based on the slave clock, set the slave device in a higher-powered mode of the at least one higher powered mode in a period prior to an expected wireless transmission of the common preamble of each frame from the master device to detect the preamble extension of a frame of the second type in the period prior to the expected wireless transmission of the common preamble;
return the slave device to a low powered mode of the at least one low powered mode when no preamble extension is detected in the period prior to the expected wireless transmission of the common preamble; and
control the slave device to wirelessly receive information from the master device and/or wirelessly transmit information to the master device when the preamble extension is detected in the period prior to the expected wireless transmission of the common preamble, and return the slave device to the low powered mode of the at least one low powered mode after the information has been wirelessly received and/or wirelessly transmitted.

15. A non-transitory storage medium storing processor implementable code, which, when executed by at least one processor of a slave device, causes the slave device to:
in accordance with a communication protocol, receive frames of a first and second type that are used by the communication protocol, the frames being of the first and second type having a common preamble and being transmitted from a master device at a known periodicity and within a known time frame wherein an amount of time between respective starts of the common preambles of successive frames of the first type or second type is fixed so that the starts of successive common preambles of the frames of the first or second type occur at a fixed periodicity, the frames of the second type having a preamble extension prior to the common preamble;
maintain the slave device in at least one low powered mode relative to at least one higher powered mode;
periodically set the slave device in a higher-powered mode of the at least one higher powered mode to receive and process frames of the second type wirelessly transmitted from the master device in accordance with the protocol;
wherein the slave device is set in the higher-powered mode based on a slave clock in a period prior to an expected wireless transmission of the common preamble of each frame from the master device to detect the preamble extension of a frame of the second type in the period prior to the expected wireless transmission of the common preamble;
the slave device is returned to a low powered mode of the at least one low powered mode when no preamble extension is detected in the period prior to the expected wireless transmission of the common preamble; and
the slave device is controlled to wirelessly receive information from the master device and/or wirelessly transmit information to the master device when the preamble extension is detected in the period prior to the expected wireless transmission of the common preamble, and return the slave device to the low powered mode of the at least one low powered mode after the information has been wirelessly received and/or wirelessly transmitted,
wherein the preamble extension is detected by identifying a predefined sequence of symbols in the preamble extension, and wherein beacon frames transmitted by the master device are received by the slave device for resynchronization of any drift by the slave device, wherein the beacon frames comprise the frames of the second type.

16. A non-transitory storage medium storing processor implementable code, which, when executed by at least one processor of a master device, causes the master device to:
in accordance with a communication protocol, wirelessly transmit frames of a first and second type that are used by the communication protocol to at least one slave device, the frames of the first and second type having a common preamble;
wherein the frames being of the first and second type are wirelessly transmitted to the at least one slave device at a known periodicity and within a known time frame based on a master clock of the master device; and
information is wirelessly received, in accordance with the communication protocol, from the at least one slave device and/or wirelessly transmitted to the at least one slave device based on a wireless transmission of a frame of the second type, wherein the common preamble after a preamble extension comprises a predefined sequence of symbols,
wherein an amount of time between respective starts of the common preambles of successive frames, including frames of the first type and frames of the second type, is fixed, and the frames of the second type have the preamble extension prior to the common preamble,
wherein the master device wirelessly transmits beacon frames for resynchronization of any drift by the at least one slave device, wherein the beacon frames comprise the frames of the second type, wherein the slave device is configured to:

maintain the slave device in at least one low powered mode relative to at least one higher powered mode, and periodically sets the slave device in a higher powered mode of the at least one higher powered mode to receive and process the frames of the first or second type wirelessly transmitted from the master device in accordance with the protocol;

based on the slave clock, set the slave device in a higher-powered mode of the at least one higher powered mode in a period prior to an expected wireless transmission of the common preamble of each frame from the master device to detect the preamble extension of a frame of the second type in the period prior to the expected wireless transmission of the common preamble;

return the slave device to a low powered mode of the at least one low powered mode when no preamble extension is detected in the period prior to the expected wireless transmission of the common preamble; and control the slave device to wirelessly receive information from the master device and/or wirelessly transmit information to the master device when the preamble extension is detected in the period prior to the expected wireless transmission of the common preamble, and return the slave device to the low powered mode of the at least one low powered mode after the information has been wirelessly received and/or wirelessly transmitted.

17. A system comprising the master device of claim 8 and at least one slave device of claim 1.

* * * * *